United States Patent [19]

Nagai et al.

[11] Patent Number: 5,096,491
[45] Date of Patent: Mar. 17, 1992

[54] AQUEOUS STARCH SLURRY ADHESIVE

[75] Inventors: Shigeki Nagai, Nakatsugawa; Kohei Hamazaki, Edogawa; Nagahisa Karube, Funabashi, all of Japan

[73] Assignee: Honshu Paper Co., Ltd., Tokyo, Japan

[21] Appl. No.: 554,192

[22] Filed: Jul. 16, 1990

[30] Foreign Application Priority Data

Jul. 19, 1989 [JP] Japan .................. 1-187058

[51] Int. Cl.$^5$ .............................. C09J 103/02
[52] U.S. Cl. .................. 106/208; 106/209; 106/213
[58] Field of Search .............. 106/208, 209, 213

[56] References Cited

U.S. PATENT DOCUMENTS

| | | | |
|---|---|---|---|
| 1,378,106 | 5/1921 | Grosvenor | 106/208 |
| 3,692,552 | 9/1972 | Rüggeberg | 106/213 |
| 4,105,461 | 8/1978 | Racciato | 106/213 |
| 4,881,084 | 11/1989 | Kar et al. | 106/25 |

*Primary Examiner*—Theodore Morris
*Assistant Examiner*—David M. Brunsman
*Attorney, Agent, or Firm*—Seed and Berry

[57] ABSTRACT

The present invention relates to a high concentration aqueous starch slurry adhesive comprising 20 to 60% of starch and the following components in the specified amount based on the weight of starch:

(1) 0.01 to 1.0% of rhamsan gum or xanthan gum,
(2) 1.0 to 3.0% of sodium hydroxide, and
(3) if necessary, up to 3% of sodium tetraborate.

According to the present invention, a high concentration aqueous starch slurry adhesive can be easily obtained at a single step by merely dispersing starch into cold water while stirring.

5 Claims, No Drawings

AQUEOUS STARCH SLURRY ADHESIVE

BACKGROUND OF THE INVENTION

The present invention relates to an aqueous starch slurry adhesive. In particular, the present invention relates to an aqueous starch slurry adhesive, which can be produced at a single step by dispersion in cold water followed by stirring.

Starch has been used in an adhesive for paper and paper board. In order to provide strong adhesion within a short period of time in the manufacture of paper board, a Stein-hall method (hereinafter referred to as SH method) has been widely employed. In this method, a main, which is an aqueous dispersion wherein ungelatinized starch particles are suspended, is added to a carrier which is a completely gelatinized starch aqueous solution. When the adhesive obtained by this method is heated, the ungelatinized starch particles of the main rapidly dissolve in heated water, while simultaneously water evaporates, whereby producing semi-solid material having a high viscosity and providing an initial adhesive power. It is necessary for the carrier to have a sufficient viscosity so that the main particles do not sediment in the carrier and so that the carrier is suitably applied to paper or the like.

However, in the SH method, the adhesive becomes highly viscous even with the presence of a small amount of starch. Therefore, it is very difficult to increase the concentration of the carrier starch to 15% or higher. Therefore, the water content becomes higher, which leads to problems such as warp. There is proposed a technique of using decomposed starch such as dextrin in order to increase the concentration. However, this technique poses a problem like decrease in adhesive strength.

As is typically disclosed in Japanese Patent Un-examined application (hereinafter referred to 'J. P. Kokai') Sho No. 52-127938, there is proposed a technique of using, as a carrier, processed starch which is decomposed or modified to a suitable degree, in order to increase the concentration. However, the total starch content of the main and carrier is at most 30% and, therefore, high concentration can not be obtained.

An attempt has been made to increase the amount of the ungelatinized starch of the main so as to highly increase the starch concentration as a whole. However, this technique has the following problem. Namely, in order to obtain the initial adhesion power, it is necessary for the main to dissolve by the heat at the time of adhesion and the immediately gels. In addition, it is indispensable to dissolve borax into the carrier in order to provide the starch adhesive with a high speed adhesive property. It is general that in the SH method, the carrier does not immediately gel by itself because the starch concentration is low, even though borax is present in the starch solution of the carrier. However, in case where the starch concentration of the main is raised and where borax is present in an amount sufficient for causing gelatinization of the carrier, the main dissolves and the carrier gels, which leads to increase in viscosity. In other words, it is difficult to increase the total starch concentration even by increasing the amount of the ungelatinized starch in the main, so long as the carrier is a starch solution.

Further, the SH method requires two steps, namely, the first step of gelatinizing starch by heat to form a carrier and the second step of adding an aqueous dispersion of a main to the resultant carrier. Therefore, this method is complicate. Accordingly, there has been proposed a method of using gelatinized cereal powder for the carrier. In this method, both the gelatinized cereal powder and ungelatinized starch or ungelatinized cereal powder are dispersed into cold water, to dissolve only a portion soluble in cold water (gelatinized starch) so as to form a carrier (J. P. Kokai Sho No. 50-63023). In this method, it becomes unnecessary to form a carrier by heating. However, the high concentration cannot be obtained and the viscosity is unstable, because the carrier is made of gelatinized starch.

SUMMARY OF THE INVENTION

Therefore, the object of the present invention is to provide a starch adhesive wherein a high concentration can be attained in a simple manner, by dispersion of the starch into cold water while stirring.

After intensive investigations made for the purpose of attaining the above-described object, the inventors have found out that a high concentration aqueous starch slurry adhesive can be formed by incorporating, into an aqueous starch slurry containing 20 to 60% of starch, the following components in the specified amount based on the weight of starch:

(1) 0.01 to 1.0% of rhamsan gum or xanthan gum,
(2) 1.0 to 3.0% of sodium hydroxide, and
(3) if necessary, up to 3% of borax.

DETAILED EXPLANATION OF THE INVENTION

The scope of starch usable in the present invention is not limited. Starch covers, for example, so-called raw starchs derived from potato, sweet potato, corn, wheat, tapioca, etc., their modified starchs such as oxidized starch, cationic starch or anionic starch, or a mixture thereof. The starch concentration of the aqueous starch slurry is 20 to 60% by weight. When the concentration exceeds 60% by weight, the viscosity of the resultant slurry rapidly becomes high and the slurry is difficult to handle.

Rhamsan gum is a natural gum which can be obtained by purifying polysaccharide which is released by the strain, ATCC 31961, deposited with American Type Culture Collection (Washington D. C.) and belonging to a gram-negative and aerobic bacterium, Alcaligenes, outside its body when the bacterium ferments glucose, and then converting it into powder. This gum has a structure wherein the main chain is constituted of two glucoses and one each of glucuronic acid and rhamnose and wherein the side chain is constituted of two glucoses, as represented by the following general formula.

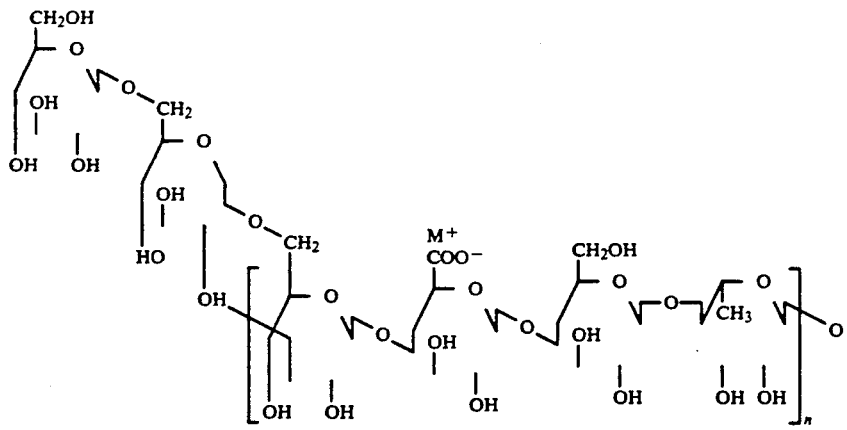

wherein M+ is sodium, calcium, potassium, etc.

Xanthan gum usable in the present invention can be produced by inoculating Xanthomonas campestris on a culture medium which contains saccharides containing glucose and an inorganic acid and wherein pH indicates slight acidity, and incubating the strain while ventilating the atmosphere. The structure of xanthan gum is not completely determined, but it is considered to be an anionic natural polymer constituted of glucose, mannose, glucuronic acid and pyruvic acid as shown by the follwoing formula:

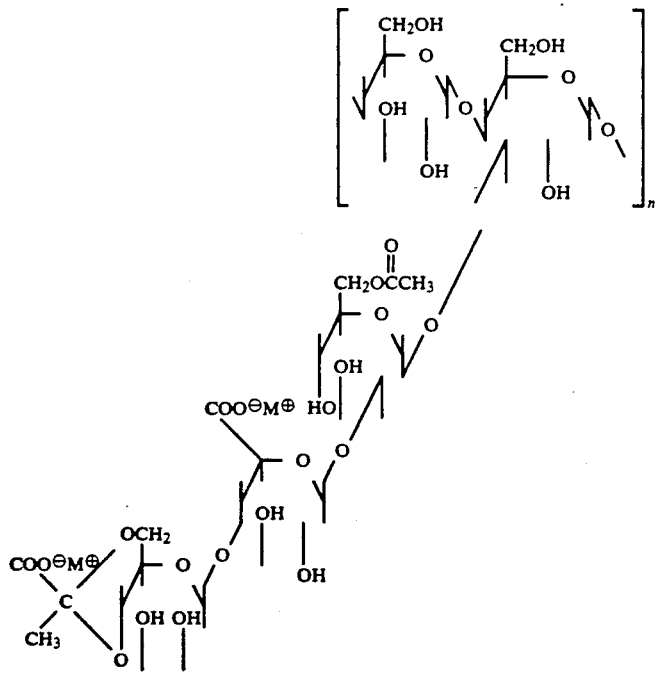

wherein M+ is Na, K or Ca.

In order to obtain a high concentration aqueous slurry, the amount of rhamsan gum or xanthan gum in the slurry should be 0.01 to 1.0 weight % based on the weight of starch. The amount is preferably 0.03 to 0.5 wt. %. When the amount of rhamsan or xanthan gum is lower than the lower limit of this range, the suspension stability of the resultant slurry decreases. On the other hand, when the amount exceeds the upper limit of the range, the fluidity of the resultant slurry is deteriorated because the viscosity of the gum itself increases.

Sodium hydroxide usable in the present invention is necessary to easily dissolve the ungelatinized starch in the main by heat in adhering process. Without sodium hydroxide, gelatinization temperature becomes about 80° C. and it takes much time to dissolve starch. On the other hand, the gelatinization temperature decreases to 40° to 50° C. with sodium hydroxide and therefore, ungelatinized starch is easy to dissolve and initial adhesion is improved. Without sodium hydroxide, PIN strength becomes 12 to 13 kgf, which is very low for an adhesive. Sodium hydroxide is used in an amount of 1.0 to 3.0 wt. %, preferably 1.5 to 2.7 wt. %, based on starch.

In general, borax may be used in an amount of up to 3 wt. % based on starch. Borax increases adhesion power without affecting the viscosity of an adhesion, and improves initial adhesion power, which accelerates lamination speed. Borax is preferably used in an amount of up to 2 wt. %.

The aqueous starch slurry of the present invention can be easily produced by simultaneously adding to water, the components in the amounts as specified in the above.

EXAMPLE

The present invention will be explained in detail below with reference to the following examples.

EXAMPLES 1 TO 4

Water in the amount specified in Table 1 was introduced into a tank. While stirring water with rotary blades, borax in the amount specified in Table 1 was introduced into the tank and consecutively adding to the tank, corn starch, rhamsan gum and sodium hydroxide as specified in Table 1, in this order. After the stirring was continued for about 20 min, an aqueous starch slurry was obtained.

The Brookfield viscosity of the slurry at 20° C. was determined for each slurry. The results are shown in Table 1.

The slurry was applied between RK(Kraft liner) 220 (g/m²) as a liner and SCP(Semi-chemical pulp) 125 (g/m²) as a core sheet so that the solid content of the slurry coated was 5 g/m² (on dry basis) and then dried, to manufacture an A-flute double faced corrugated board.

The adhesion strength of the resultant board between the liner and the core sheet was determined according to JIS Z0402. The results are shown in Table 1 as PIN strength.

EXAMPLE 5

Example 3 was repeated except that borax was not used, to manufacture an aqueous starch slurry and its brookfield viscosity was determined (see Table 1).

In the same manner as Example 3, the PIN strength of the resultant board between the liner and the core sheet was determined using the slurry (see Table 1).

EXAMPLES 6 AND 7

Examples 2 and 3 were repeated except that rhamsan gum was changed to xanthan gum, to manufacture aqueous starch slurries and their Brookfield viscosities were determined (see Table 1).

The PIN strength of the resultant boards between the liner and the core sheet were determined in the same manner as Examples 2 and 3 and using the resultant slurries.

TABLE 1

|  | 1 | 2 | 3 | 4 | 5 | 6 | 7 |
|---|---|---|---|---|---|---|---|
| Corn starch (part) | 20 | 30 | 40 | 50 | 40 | 30 | 40 |
| Rhamsan gum (part) | 0.02 (0.1)* | 0.0315 (0.105) | 0.036 (0.09) | 0.025 (0.05) | 0.036 (0.09) | — | — |
| Xanthan gum (part) | — | — | — | — | — | 0.030 (0.1) | 0.034 (0.085) |
| Sodium hydroxide (part) | 0.52 (2.6) | 0.72 (2.4) | 0.84 (2.1) | 0.95 (1.9) | 0.76 (1.9) | 0.69 (2.3) | 0.84 (2.1) |
| Borax (part) | 0.20 (1) | 0.30 (1) | 0.40 (1) | 0.50 (1) | — | 0.15 (0.5) | 0.20 (0.5) |
| Water (part) | 79.26 | 68.95 | 58.72 | 48.53 | 59.20 | 69.13 | 58.93 |
| Brookfield viscosity (cp) | 150 | 138 | 233 | 323 | 215 | 134 | 220 |
| PIN strength (kgf) | 28.8 | 27.5 | 29.0 | 28.1 | 27.0 | 30.3 | 26.0 |

*The number in the parenthesis is the value (%) of the amount used based on the weight of starch.

From Table 1, it is apparent that a high concentration starch adhesive can be easily obtained at a single step.

What is claimed is:

1. A high concentration aqueous starch slurry adhesive comprising 20 to 60 wt. % of starch and the following components in the specified amount based on the weight of starch:
   (1) 0.01 to 1.0% of rhamsan gum or xanthan gum, and
   (2) 1.0 to 3.0% of sodium hydroxide.
2. The adhesive of claim 1, wherein the amount of rhamsan gum or xanthan gum is 0.03 to 0.5 wt. % based on the weight of starch.
3. The adhesive of claim 1, wherein the amount of sodium hydroxide is 1.5 to 2.7 wt. % based on the weight of starch.
4. The adhesive of claim 1 further comprising up to 3 wt. % of borax based on the weight of starch.
5. The adhesive of claim 4, wherein the amount of borax is 2 wt. % based on the weight of starch.

* * * * *